United States Patent [19]

Binder

[11] Patent Number: 4,574,226
[45] Date of Patent: Mar. 4, 1986

[54] METHOD AND APPARATUS FOR CONTROLLING AN ELECTRIC MOTOR THE ROTATIONAL SPEED OF WHICH IS AUTOMATICALLY REDUCED IN NO-LOAD IDLING OPERATION

[75] Inventor: Alfred Binder, Bisingen, Fed. Rep. of Germany

[73] Assignee: Kress-Electrik GmbH & Co., Bisingen, Fed. Rep. of Germany

[21] Appl. No.: 543,268

[22] Filed: Oct. 19, 1983

[30] Foreign Application Priority Data

Sep. 29, 1983 [DE] Fed. Rep. of Germany ....... 3335237

[51] Int. Cl.$^4$ .............................................. H02P 7/38
[52] U.S. Cl. .................................... 318/317; 318/434; 318/334; 318/332; 318/327
[58] Field of Search ............... 318/326, 327, 317, 332, 318/334, 336, 345, 430, 432, 434, 436

[56] References Cited

U.S. PATENT DOCUMENTS

| | | | |
|---|---|---|---|
| 3,950,684 | 4/1976 | Peterson | 318/338 |
| 4,156,162 | 5/1979 | Warfield et al. | 318/434 |
| 4,157,491 | 6/1979 | Werner et al. | 318/332 X |
| 4,288,828 | 9/1981 | Kuntner et al. | 318/430 X |
| 4,300,079 | 11/1981 | Kawada et al. | 318/278 X |
| 4,302,713 | 11/1981 | Cutler et al. | 318/436 X |
| 4,307,325 | 12/1981 | Saar | 318/334 |
| 4,317,176 | 2/1982 | Saar et al. | 318/334 X |
| 4,410,846 | 10/1983 | Gerber et al. | 318/327 X |

FOREIGN PATENT DOCUMENTS 2755401 6/1979 Fed. Rep. of Germany ...... 318/317

Primary Examiner—William M. Shoop, Jr.
Assistant Examiner—Shik Luen Paul Ip
Attorney, Agent, or Firm—McAulay, Fields, Fisher, Goldstein & Nissen

[57] ABSTRACT

A method and apparatus for controlling an electric motor, in particular a motor for driving hand tools, saws, and the like, the rotational speed of which is automatically reduced in no-load idling operation and increased when working under load to pre-determined speed values corresponding to desired working speeds. A current sensor picks up the current absorbed by the electric motor and causes the speed of the electric motor to be abruptly changed when a load condition has been detected. A timing relay maintains the electric motor at the higher working speed for a pre-determined period of time after termination of the operation under load. The threshold value of the sensitivity of the current sensor is raised simultaneously with the change-over to the higher working speed.

19 Claims, 5 Drawing Figures

METHOD AND APPARATUS FOR CONTROLLING AN ELECTRIC MOTOR THE ROTATIONAL SPEED OF WHICH IS AUTOMATICALLY REDUCED IN NO-LOAD IDLING OPERATION

PRIOR ART

The invention starts out from a method and an apparatus for controlling an electric motor the rotational speed of which is automatically reduced in no-load idling operation and increased under load to pre-determined values. Control devices effecting the automatic adaptation of the rotational speeds of an electric motor to a no-load idling mode and a load working mode have been previously known (Swiss Patent Specification No. 580 883; German Patent Publication No. 24 07 601).

In the case of the known control devices, the rotational speed of an electric motor is automatically and abruptly lowered in the idling mode - for instance with a view to reducing the noise level. This lowering of the rotational speed is achieved by sensing the current input of the motors via an inductive current transformer, comparing it with a threshold value and using it thereafter for triggering for instance a semi-conductor switch in the form of a Triac arranged in the motor circuit.

The transition from the idling mode to the working mode is effected in the known control devices either simply by switching over from full-wave current supply to half-wave current supply of the motor, or else by a very complicated arrangement in which a center-tapped secondary winding of the current transformer is connected with diodes in such a manner that the connection of the current transformer and diode arrangements to the base and emitter, respectively, of a switching transistor provided in the control circuit of the Triac must be geared to the forward voltages of the diodes, compared with the emitter junction of the transistor (German Patent Specification No. 24 07 601). The resulting voltage differences are then employed to effect switching over from idling operation to the working mode. However, the foreward voltages of diodes, as well as the base-to-emitter voltages of transistors are frequently a function of their technological design and not always identical so that the individual components must be selected with great care to ensure the desired abrupt switching at pre-determined rotational speeds.

It is another drawback of the known control device that the switching action follows the changes of the motor current directly so that the system will switch back to the idling speed already when work under load is interrupted for a short time, or maybe even in the case of load variations. Further, there is no possibility to have the sensitivity of the current sensing means automatically adjusted to the different currents encountered under no-load conditions at idling speed on the one hand, and working speed on the other hand.

It is a further drawback of the known control device that when the motor is switched on it is immediately switched over to working speed because the initially very high motor current causes the device to switch over immediately to the rated working speed.

It has been generally known, for instance in connection with electric motors used for driving hand tools, to keep the speed of such tools constant during operation by the use of a speed control circuit by which pre-determined reference speed values are compared with actual speed values and a final control element, normally a phase control using a Triac, is triggered correspondingly. This makes it possible to prevent the speed from dropping as load rises during the working operation. It has also been known to provide two or more reference speed values which may even be continuously variable. In this case, switchingover from one reference speed value to another is effected by means of keys, switches or rheostats.

Now, it is the object of the present invention to adapt an electric motor whose rotational speed is automatically switched from no-load idling operation to working under load, and vice versa, to the practical needs and to ensure for instance that load variations or even short-time interruptions of the load are balanced out, that the motor can be safely switched back to the idling mode even when the current input at working speed, but in no-load condition, is higher than at idling speed or in the waiting mode, and quite generally to influence the operation in a stabilizing sense.

ADVANTAGES OF THE INVENTION

According to the invention, this object is achieved by the characterizing features of the main claim as regards the apparatus, and the first process claim as regards the method. It is an advantage of the invention that due to the fact that the sensitivity of the current-sensing means is switched over simultaneously with the transition to operation under load, the capacity of the sensing means to distinguish between no-load operation and operation under load is automatically adjusted so that switching orders are safely released even at increased working speeds. According to another advantage of the present invention, switchingback of the electric motor to the idling or waiting speed is then actually effected by the switching orders thus released at the end of a pre-determined delay. This delay ensures that the motor is not immediately switched back to the lower speed when operation under load is interrupted for a short time only, and eliminates thus the need to speed up the motor after every such interruption.

The electric motor controlled in accordance with the invention and used, for instance, for driving portable machine tools, circular saws, or the like, offers one or more reference speeds in the conventional working speed range, and a lower waiting speed which may be described also as idling speed and at which the respective machine, or rather the electric motor driving it, operates when not working under load, i.e. before and after every working operation and during short interruptions of work. As a result, the noise level of the machine is considerably reduced—an advantage which may be particularly important for instance in the case of circular saws—and the power consumption of the machines is of course also notably lower during these times.

The need for a working speed is determined by electronic means, by the use of a current-sensing element and processing of its output signal, because the power input of the electric motor increases as the machine is loaded, and this even when the machine operates at idling speed.

The timing relay responsible for the after-running of the electric motor when the load is interrupted is retriggerable. This means that the timing relay is reset, and the working speed is maintained, when the power consumption of the motor starts to rise again during the no-load after-running period—i.e. when the motor operates at working speeds, but in the no-load condition.

The working speed can then be additionally stabilized by the speed-control circuit independently of the load.

Further advantageous modifications and improvements of the invention are rendered possible by the features described in the sub-claims. One particularly advantageous arrangement comprises a gate circuit for suppressing the initial short-time current peak which is always encountered when starting an electric motor. As a result of this feature of the invention, the electric motor, and the machine driven by it, are prevented from switching to working speed immediately when the motor is started. This is effected by a delay circuit which prevents the motor from being switched to working speed before the initial current has died away and the idling speed has been reached.

The speed control circuit preferably provided in combination with the present invention may comprise a tacho-generator connected with the shaft of the machine. The said tacho-generator has for its purpose to generate a voltage proportional to the actual speed, for comparison with the pre-set reference speed value and adjustment of the speed of the electric motor via the before-mentioned phase control.

It goes without saying that the invention may be used also in machines driven by an electric motor which offer two or more different working speeds, for instance for working different materials. The selection of the different working speeds, to which the machine is finally accelerated starting from the idling speed, is effected in the conventional manner through pre-selection by means of keys, switches or slider rheostats.

It is another advantage of this invention that no uncontrolled behavior of the system is encountered for instance when the machine is switched on and off in rapid sequence, but at arbitrary intervals, but that the system will always start from the initial condition, whether or not the motor has come to a standstill and regardless of the decay time that must be taken into account for the different components. To say it with other words: Every time the machine is started, the motor is switched to idling speed or, rather, to waiting speed, from which it can be accelerated very rapidly when full load is demanded, which is automatically the case when the electric motor is loaded. To effect this acceleration, additional circuit components are provided which act upon the normally existing automatic smooth-starting means.

It is an additional advantage of the invention that special temperature compensating means are provided to account for the temperature condition of the machine or the degree to which the machine has been heated up, with respect to the sensitivity of the current-sensing means, so that sensitive regulation and safe control is achieved, whether a cold machine is started for the first time, or a thoroughly warmed-up machine is re-started after a short interruption of work.

A particular advantage of the present invention is to be seen in the fact that it offers the possibility to make extensive use of integrated circuits which may even be totally integrated with a - preferably likewise integrated - control unit and the remaining circuit components, such as resistors and capacitors.

It should be noted in this connection that the circuits described herein by way of example are meant to illustrate only the characteristic functions of the invention and their mutual interaction, rather than the discrete circuit design of which they are only examples. It is therefore also possible, as mentioned before, to integrate smaller or larger portions of the circuit and to give them the form of a logic control circuit, micro-computer, micro-processor, or the like, provided of course that the effects and functions described hereafter in connection with the non-integrated circuit are still achieved. The invention then relates also to large-scale integrated units and systems in which the different operating sequences are carried out substantially in serial mode, by inquiry of a storage.

In a further improvement of the invention, the momentary actual value of the current absorbed by the electric motor is advantageously determined by a resistor and subsequent amplification by the control unit itself so that the measuring voltage available is sufficiently high and its variation in response to variations in load are sufficiently notable, in spite of the low resistance of the resistor which is connected in series with the motor. Another advantage is to be seen in the fact that the speed governor is provided with a smooth-starting circuit comprising a capacitor, which serves to reduce the starting current occurring initially when the electric motor controlled by it is switched on. The speed governor resets, i.e. discharges, the capacitor automatically every time the motor is switched off, and the connection of the delay circuit—which is part of the system of the invention for switching over from the idling to the working speed—to the capacitor of the smooth-starting means ensures that the delay circuit is always automatically reset to the original initial conditions, no matter how many times the machine is switched on and off.

DRAWING

Certain examples of the invention will be described hereafter in detail and are represented in the drawing in which FIG. 1 shows a fundamental block diagram of the present invention;

DESCRIPTION OF EXAMPLES

Figure 1:
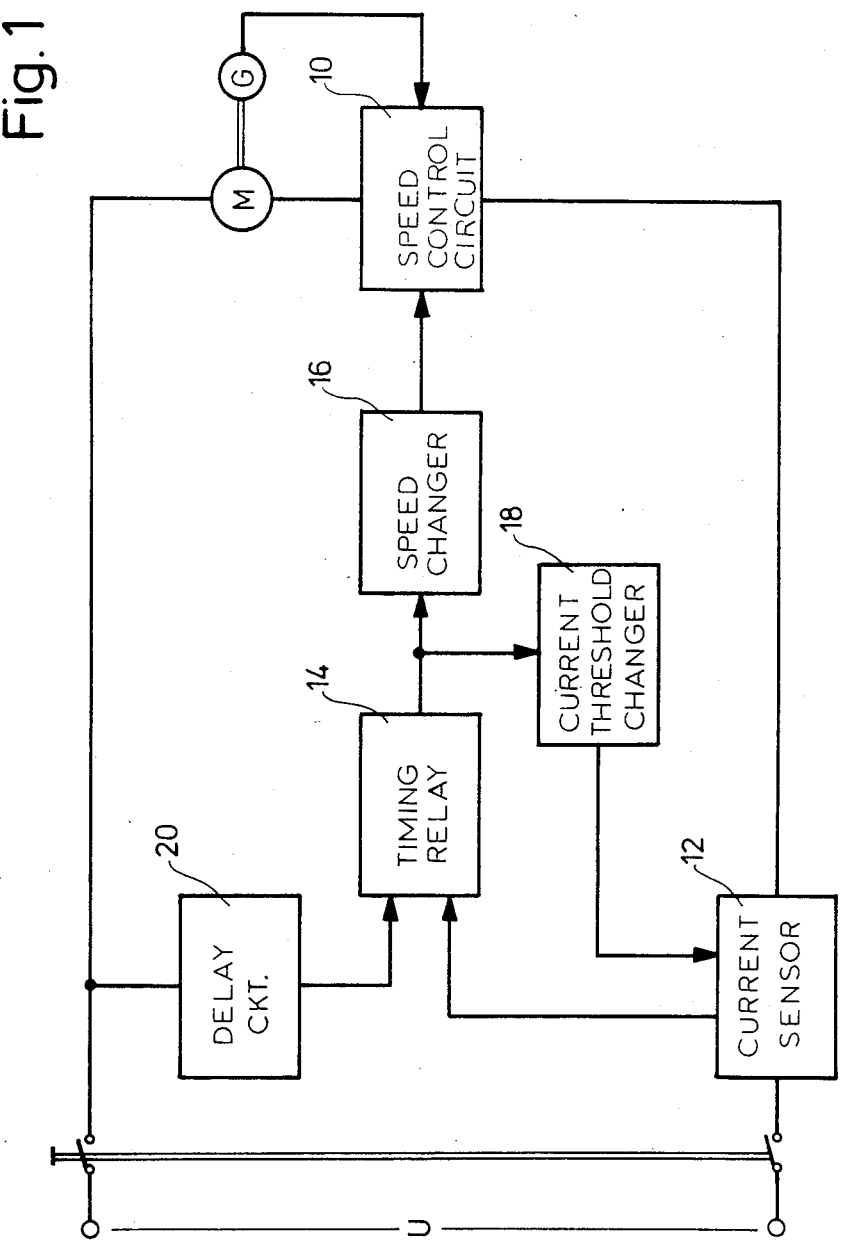

According to FIG. 1, the supply voltage U is supplied to the electric motor M via a speed control circuit 10 and a current-sensing element 12, for driving a hand machine tool or the like. For the purpose of generating a reference speed value, there may be provided a tacho-generator G driven by the shaft of the electric motor M and supplying its output signal to the speed control circuit 10. The speed control circuit 10 controls the current supplied to the electric motor M for instance via a conventional phase control by adjusting the actual speed value to a reference value supplied by the speed control circuit 10.

The current-sensing means 12 senses at any time the current momentarily absorbed by the electric motor M. When the current intensity determined by the current-sensing means 12 exceeds a pre-determined threshold value, the timing relay 14 is triggered by the current-sensing means 12. The timing relay 14 is followed by speed-changing means 16. The speed-changing means 16 supply the reference speed value to the speed control circuit 10. When the timing relay 14 is in the untriggered condition, the speed-changing means 16 supplies a lower reference speed value corresponding to the idling speed. As long as the timing relay 14 is in its triggered condition, the speed-changing means 16 supplies a higher reference speed value which corresponds to the working speed of the hand machine tool.

The timing relay 14 has a certain lag so that it remains in its triggered condition for a certain time after the end of the triggering signal supplied by the current-sensing means 12, and continues during this period of time to supply the high reference speed value to the speed-changing means 16. Moreover, the timing delay 14 is retriggerable which means that the lag starts anew every time the triggering signal is received from the current-sensing means 12.

The timing relay 14 further acts to trigger threshold-value changing means 18 which in the triggered condition of the timing relay 14 raise the current threshold value of the current-sensing means 12. The current-sensing means 12 supplies in this case a triggering signal to the timing relay 14 only when the current absorbed by the electric motor M exceeds a current threshold value which is obtained when the electric motor M operates in the no-load condition at the high working speed.

Further, a delay circuit 20 is provided. The delay circuit 20 blocks the timing relay 14 for a pre-determined period of time after the supply voltage U has been switched on. The length of delay produced by the delay circuit 20 is selected to ensure that the timing relay 14 can be triggered by the current-sensing means 12 only when after switching on the supply voltage U the speed of the electric motor M has risen to the low idling speed. Due to the action of the delay circuit 20, the high current consumption of the electric motor M during the starting phase does not immediately trigger the timing relay 14 and does not immediately cause the speed control circuit 10 to go up to the high working speed.

Figure 2:
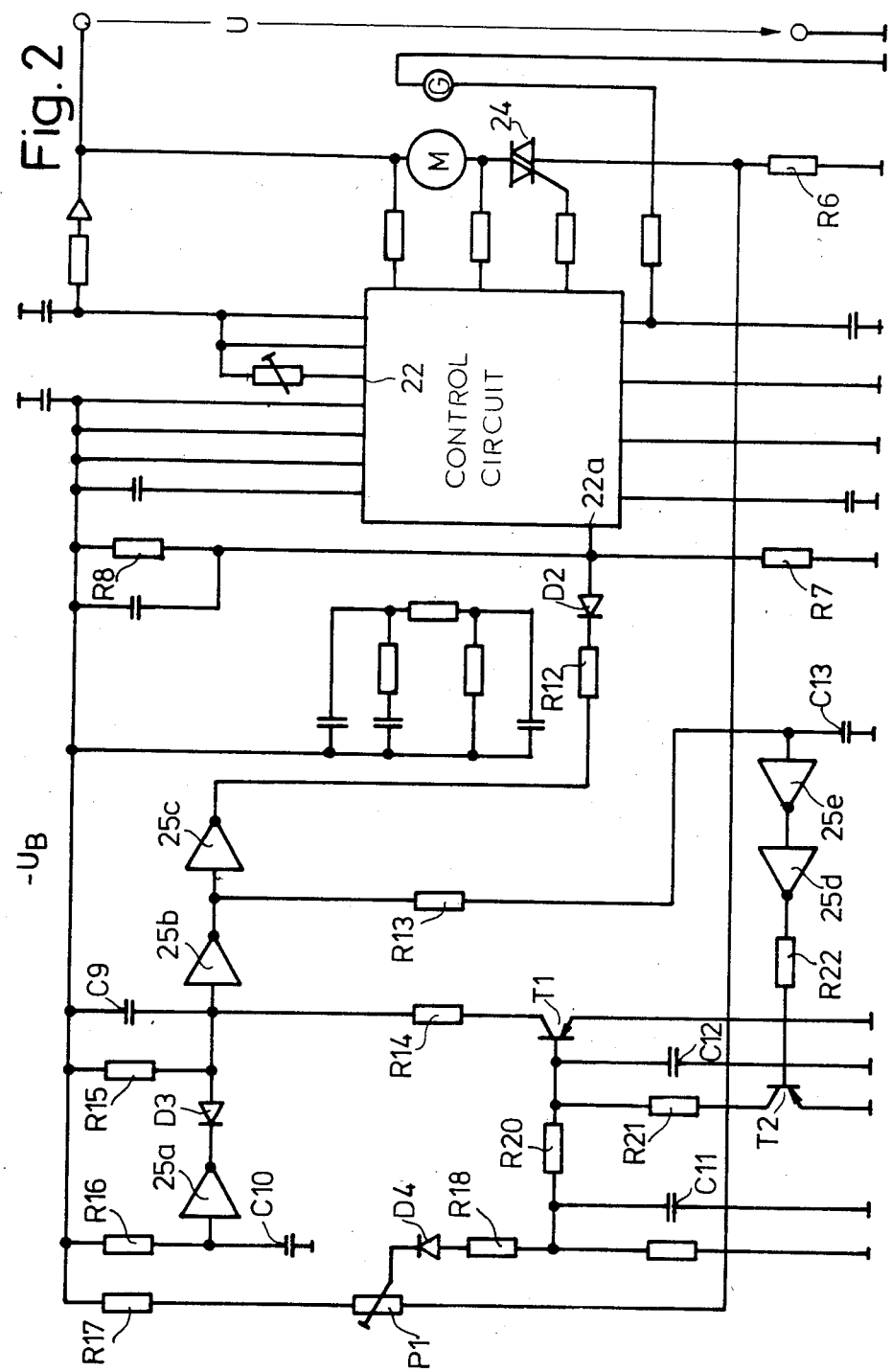
FIG. 2 shows the details of a circuit, based on the block diagram of FIG. 1.

FIG. 2 shows a detailed representation of one embodiment of the circuit arrangement shown in the block diagram of FIG. 1.

Speed Governor I

The speed control circuit 10 consists of a conventional control circuit designed as integrated circuit 22 which switches a Triac 24 connected in series with the electric motor M, for phase control. The integrated control circuit 22 is supplied with the output voltage of the tacho-generator G as reference speed value. The voltage corresponding to the reference speed value given at any time is supplied to the integrated circuit 22 in a manner which will be described further below.

Current-Sensing Means I

The current absorbed by the electric motor M is determined by current-sensing means 12 designed in the following manner. A negative supply voltage $-U_B$ builds up over the resistor R17, the potentiometer P1 and the resistor R6 a DC voltage which is tapped at the potentiometer P1. The resistor R6 is connected in series also with the electric motor M so that the voltage drop encountered across this transistor R6 and, thus, the voltage tapped at the potentiometer P1, is additionally influenced by the current consumed by the electric motor M.

The direct voltage tapped at the potentiometer P1, which is of a wavy nature when the motor is supplied with alternating current, is applied to the base of a transistor T1 via a diode D4. The potentiometer P1 is set to ensure that when the machine idles at a low waiting speed, the transistor T1 is blocked by the DC voltage applied to it. When the current input of the electric motor M rises under load, this causes the voltage drop across the resistor R6 to increase, the voltage tapped at the potentiometer P1 to rise, and the transistor T1 to be connected through. Between the diode D4 and the transistor T1, there are provided two integrator elements consisting of the resistor R18 and the capacitor C11 on the one hand and the resistor R20 and the capacitor C12 on the the other hand. These integrating elements prevent the transistor T1 from being connected through by interfering voltage peaks.

Timing Relay I

As a result of the through-connection of the transistor T1, the timing relay 14 described hereafter is triggered. The threshold value for the current input of the electric motor M at which the transistor T1 is connected through and the timing relay 14 is triggered, can be pre-set by means of the potentiometer P1.

The transistor T1 has connected to it in series a capacitor C9 which is charged via a series resistor R14 when the transistor T1 is connected through, the charging time constant being very short, in the range of approx. 10 ms.

As long as the hand machine tool is loaded operating under load, i.e. the current input of the electric motor M remains above the pre-set threshold value, the transistor T1 remains connected through to keep the capacitor C9 in the charged condition. But as soon as the hand machine tool is no longer loaded so that the current consumed by the electric motor drops below the pre-set threshold value, the transistor T1 returns to the blocked condition. The capacitor C9 is discharged via a resistor R15. The time constant which is determined by the capacitor C9 and the resistor R15 determines in turn the lag of the timing relay 14. If the hand machine tool is loaded again during this time lag, the transistor T1 is once more connected through and the capacitor C9 is once more recharged so that the time lag starts anew which means that the timing relay 14 is retriggerable.

Speed-Changing Means I

The timing relay 14 controls the speed-changing means 16. The voltage applied to the input 22a of the integrated circuit 22 determines the reference speed value of the speed control circuit 10. The input 22a is connected on the one hand to a voltage divider formed by the resistors R8 and R7, and on the other hand to the capacitor C9 via two inverters 25b and 25c connected in series, a resistor R12 and a diode D2.

When the motor is in the unloaded and the capacitor C9 in the discharged condition, the negative operating voltage $-U_B$ is applied to the output of the inverter 25c so that the resistor R12 is connected in parallel to the resistor R8 via the diode D2. The voltage at the input 22a of the integrated circuit 22 is thus more negative, and the speed control circuit 10 keeps the speed of the electric motor M (as agreed) at a low idling speed. When the machine is loaded, the capacitor A9 is charged so that the voltage at the output of the inverter 25c gets more positive so as to block the diode D2. The voltage at the input 22a is now determined only by the voltage divider ratio of the resistors R7 and R8 so that it rises to a higher level. Consequently, the speed control circuit 10 accelerates the electric motor M to the higher working speed, in response to this higher voltage encountered at the input 22a. When the machine is no longer loaded, the speed is switched back to the lower operating speed as soon as the voltage at the capacitor C9 has dropped at the end of the time lag of the timing relay 14 to the level in which the diode D2 becomes active again.

Threshold-Value Change-Over Means I

The connection point between the inverter 25b and the inverter 25c is connected to the control input of a transistor T2 via an integrating element consisting of a resistor 13 and a capacitor C13, inverters 25e and 25d connected in series, and a resistor R22. The transistor T2 is connected to the base of a transistor T1, in series-connection with the resistor R21.

This arrangement forms the threshold-value change-over means 18 which functions in the following manner. When the machine is in the unloaded condition, and the capacitor C9 in the discharged condition, the output of the inverter 25b is at positive potential and accordingly the output of the inverter 25d is likewise at positive potential, so that the transistor T2 is in the blocked condition. However, when the timing relay 14 is triggered and the capacitor C9 is charged, the output of the inverter 25b is at negative potential and the output of the inverter 25d assumes likewise negative potential so that the transistor T2 is connected through. This activates the resistor R21 so that it forms together with the resistor R20 a voltage divider for the voltage arriving from the potentiometer P1. Due to this voltage divider, the resistor R6 must couple in a higher voltage drop to connect the transistor T1 through This means that the current threshold value of the current sensing means 12 is increased.

The voltage divider ratio of the resistors R20 and R21 is further selected to ensure that the transistor T1 is not connected through when the voltage drop at the resistor R6 corresponds to the power consumption of the electric motor M in its un-loaded condition (idling condition) at high working speed. The transistor T1 is connected through only when the power consumption of the motor under load rises above the threshold value of the current consumed by the motor at no-load working speed. Thus, the timing relay 14 is retriggered during the time lag only when another loading condition actually occurs.

The integrating element comprising the resistor R13 and the capacitor C13 ensures that the threshold value is switched over with a certain delay after triggering of the timing relay 14, which delay is determined by the time constants of the resistor R13 and the capacitor C13. So, the sensitivity of the current-sensing means 12 is reset only when the electric motor M has been accelerated to working speed. In this manner hunting is avoided.

Cut-In Delay Circuit Means I

To avoid the high initial current intensity encountered when switching on the electric motor M from causing an immediate acceleration to working speed, the following cut-in delay circuit means is provided.

The capacitor C9 of the timing relay 14 is by-passed by a diode D3, an inverter 25a, and an integrating element comprising a resistor R16 and a capacitor C10, all connected in series.

When the operating voltage $-U_B$ is switched on, the capacitor C9 is short-circuited by the initially active diode D3 so that it cannot be charged by the transistor T1. Only when the capacitor C10 is charged at the end of a time constant determined by itself and the resistor R16 can the diode D3 be blocked so that the capacitor C9 can be charged, i.e. the timing relay 14 can be triggered. Thereafter, the capacitor C10 remains charged, and the diode D3 blocked, as long as the operating voltage $-U_B$ is applied.

Figure 3:
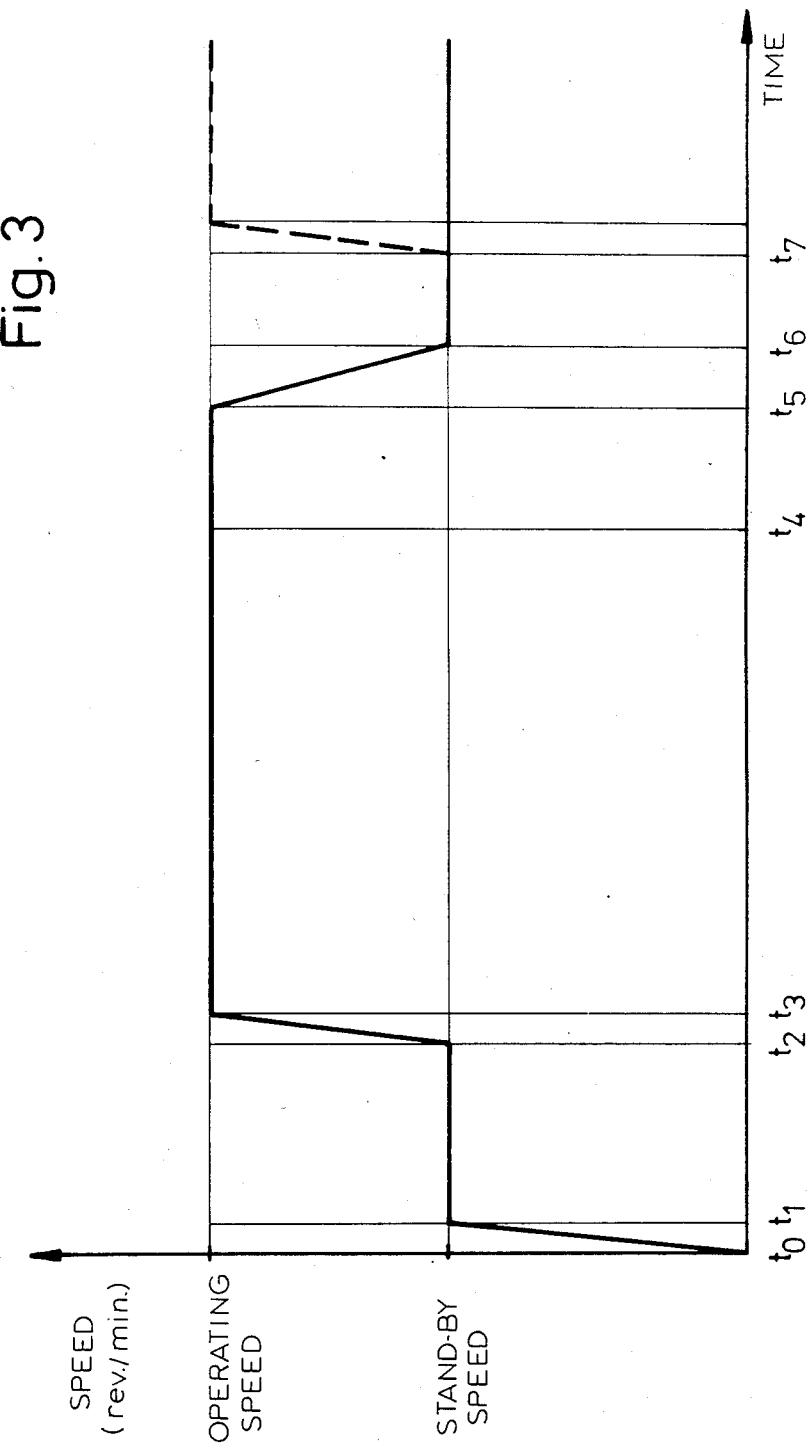
FIG. 3 shows a possible speed/time diagram, for the switching function between an idling speed and at least one working speed.

In the diagram of FIG. 3, the speed n is represented as a function of the time t, to illustrate the operation and function of the circuit arrangement of the invention.

At the moment t0, the hand machine tool, for instance a circular saw, is switched on. The electric motor M starts running and accelerates to the low idling speed of for instance 2200 to 2300 r.p.m., which speed is reached at the moment t1. The cut-in delay circuit 20 is active during the time interval between the moments t0 and t1 so that the high power input of the electric motor M in the starting phase does not cause the timing relay 14 to be triggered. Now, the hand machine tool operates at the low idling speed until working with the machine is started at the moment t2. The load causes the current consumption of the electric motor M to rise quickly so that the timing relay 14 is triggered within about 10 ms and the speed control circuit 10 is switched by the speed change-over circuit 16 to the higher working speed. The electric motor M now accelerates within about 0.5 s to the high working speed of about 3800 to 4000 r.p.m. which is reached at the moment t3. This high working speed is maintained by the speed control circuit 10 during the full working time, up to the moment t4. When work is interrupted at the moment t4, the working speed is further maintained up to the moment t5, i.e. for about 5 seconds corresponding to the time lag of the timing relay 14. If during the said time lag, i.e. between the moments t4 to t5 no new working operation is started which would retrigger the timing relay 14, the speed change-over circuit 16 is reset at the moment t5 to the lower reference speed value, and the speed of the electric motor M drops to the idling speed which is reached at the moment t6. The hand machine tool now operates at this lower idling speed, at a lower noise level, until the next working operation is started at the moment t7.

Figure 4:
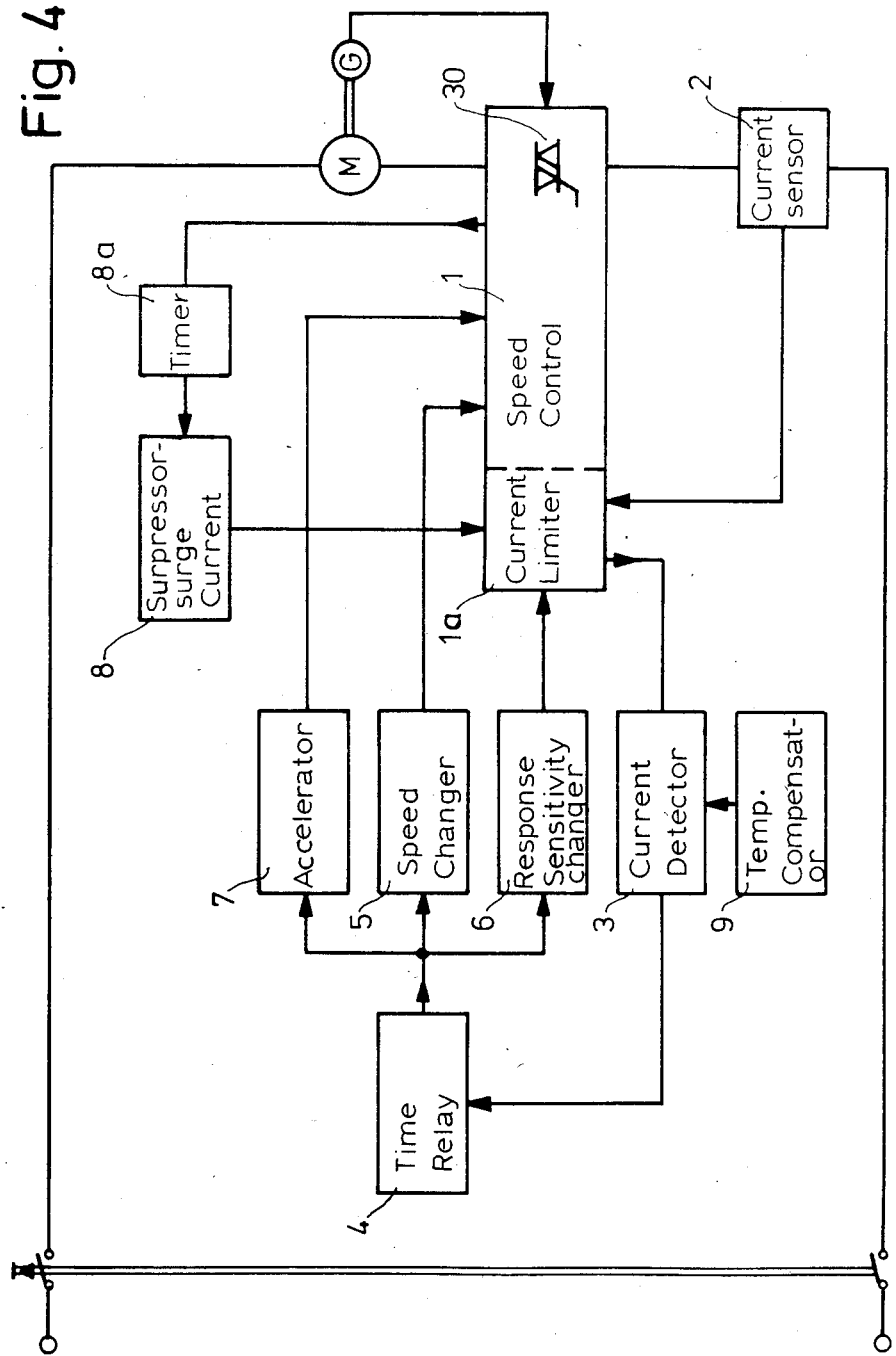
FIG. 4 shows an extended block diagram of another example of the invention.
Figure 5:
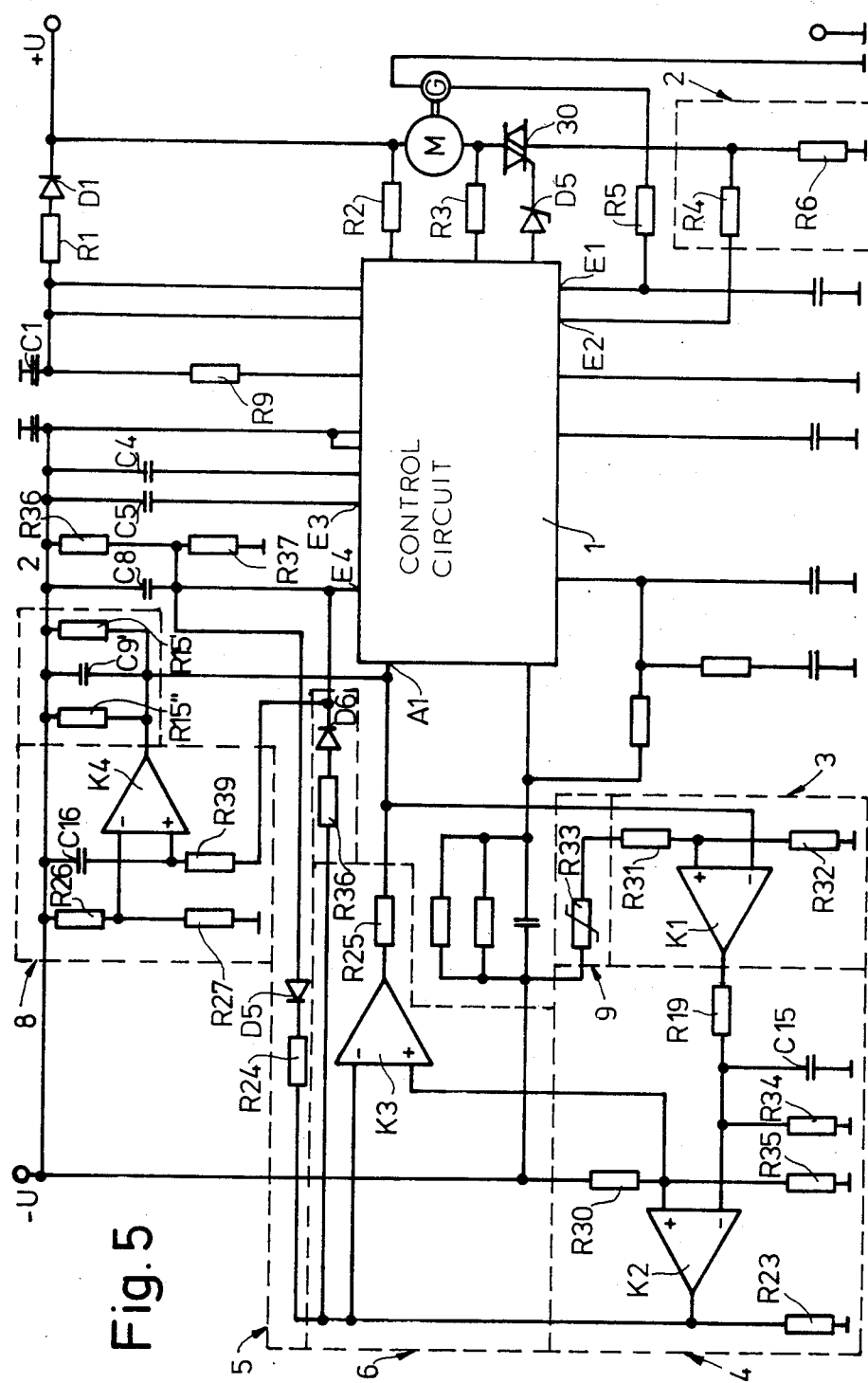
FIG. 5 shows a detailed representation of a preferred embodiment of a device for switching automatically between an idling speed and a working speed, in accordance with the block diagram of FIG. 4, and using integrated circuitry units.

The second example shown in FIGS. 4 and 5 is likewise based on the fundamental principles just described, but deals with them in a more general manner and permits practical operation under the most different working conditions. In the following description, just as before, different units of the circuit arrangement of the invention will be described under separate headings for the reader's convenience. As the units described hereafter are part of the second embodiment, they will be identified in the headings by a II to distinguish them from the first embodiment.

Block Diagram of the Second Embodiment

A governor 1 monitors and controls the speed of the electric motor M which is connected in series with the Triac 30 controlled by the governor (phase control through the control units) and current-sensing means 2, and which when triggered correspondingly by other external or internal circuitry and/or elements implements the invention in the control of the motor M. The governor 1 may consist of a logic control circuit, an amplifier/comparator/ triggering circuit composed for instance of discrete components arranged on a print board, or a microcomputer, microprocessor or the like. For the implementation of the invention it is essential only that the functions described hereafter in connection with the individual components are still performed. This is of course also true for the first embodiment.

The governor has associated to it a current-sensing and limiting circuit 1a, which may also be integrated into the governor or the integrated circuit by which the latter is formed, further a current-detecting block 3 which has the function to prepare the alternation between the waiting speed (idling speed) and the working speed (for instance the rated speed). The current-detecting circuit 3 receives from the governor 1, 1a an amplified current signal supplied by the current-sensing means 2. The current-detecting circuit 3 controls a retriggerable timing relay 4 which, due to its particular design, assumes different switching conditions for predetermined periods of time, in response to the loading of the motor M, which conditions are evaluated in a convenient manner for speed-changing purposes, by a circuit block 5 connected to its output end, and then used to change the speed by supplying a signal to the governor 1 which then controls the motor via the Triac 30.

The circuit block 4 forming the retriggerable timing relay controls in parallel a circuit block 6 for changing the response sensitivity. This arrangement permits to adjust the sensitivity to the current detected at any time so that the no-load condition of the electric motor M can be safely detected even after the motor as been accelerated to working speed. There is further provided a circuit block 7 for ensuring the effective acceleration to working speed when the retriggerable timing relay signalizes a load condition of the electric motor M. This improves the response behavior; there is practically no waiting time until the motor reaches its full output, and the speed curve during acceleration is rendered steeper.

Finally, there is provided a circuit block 8 which suppresses the effect of the high initial current normally encountered when starting the electric motor, as otherwise the system of the invention would react by accelerating the motor to working speed every time the motor is switched on. The suppression of the initial current is effected with a certain lag, through a timing element 8a connected in series.

Lastly, there is associated to the current-detecting circuit block another circuit block 9 for compensating the temperature of the controlled electric motor M and in a certain sense also of the entire machine driven by the electric motor. This ensures the compensation of different current variations that may result merely from the temperature conditions of the machine, without change of the load. To say it in other words, the system of the invention reacts independently, and without being influenced by the motor and winding temperature given at any time. Hereafter, the arrangement, connection and function of the circuit blocks 1 to 9 will be described in detail with reference to FIG. 5.

Speed Control Means II

The speed control effected by the governor 1 may be of the usual standard type and designed to ensure that specific pre-determined speed values are maintained during operation, independently of the load. While the practical implementation of such an arrangement is not essential to the invention and cannot, therefore, limit the scope of this invention, this may be effected by an actual value pick-up in the form of a Tacho-generator G driven by the motor M whose output signal is supplied to the actual speed value input E1 of the governor 1 via a resistor R5. The speed control is then effected in the normal manner by supplying a pre-set reference speed value to the governor 1, comparing it with the actual value received at the input E1 and triggering the Triac 30 via a diode D5, preferably in the manner of a phase control circuit. The predetermined reference speed value is supplied to the governor 1 either by manual setting through the user or, when the present invention is used, also in the manner described below.

Current-Sensing Means II

The current-sensing means II is realized by a resistor R6 connected in series with the motor M and its controlling Triac 30 and having, of course, a very low resistance, the voltage drop of the said resistor caused by the motor M being supplied to the IC of the control unit 1 (input E2 for the actual load current value) via a resistor R4. The voltage signal thus received is amplified in a suitable manner in the control unit 1, if necessary also rectified and then supplied to an output A1 at which the voltage signal which is proportional to the load current is integrated via the RC network consisting of the capacitor C9' and the resistors R15' and R15" connected in parallel.

The following should be noted in this connection. In FIG. 5, the individual circuit components have been surrounded as far as possible by broken lines to establish a relation to FIG. 4. Further, in implementing the circuit of the invention one selected—mainly in the area of the circuit components that will be described hereafter—a negative voltage supply (−U) relative to zero potential or ground. This does not in any way restrict the invention. The supply voltages have been selected in this manner for mere convenience. The motor M is usually supplied with alternating current.

When the integral obtained at the capacitor C9' of the current-sensing means and applied to the output A1 of the control unit exceeds a pre-determined value, the current limiting means incorporated in the control unit 1 can become active.

Current-Detecting Means II

For the purposes of the current-detecting function, the capacitor C9' of the current-sensing means is connected to one input (inverting input) of a comparator K1 which may take the form of an integrated unit, just as the other comparators that will be described hereafter. The other input of the comparator is supplied, via the voltage divider circuit set up between −U and ground and comprising the resistors R31 and R32 and a resistor R33 designed as NTC resistor, with a reference potential which, leaving the influence of the NTC resistor initially out of regard, can be described as constant so that the comparator K1 is capable of detecting any voltage rise beyond a predetermined threshold value encountered at C9' when the machine is loaded, even though the load may be very low. In the practical example shown in the drawing, the integration at the capacitor C9' leads to a voltage rise in the positive direction being encountered on the inverting input of K1 only when the load of the electric motor M rises, in which case the comparator K1 will switch over and charge via the resistor R19 a series-connected capacitor C15 with—in the present practical example—a voltage rising in the negative direction.

Temperature-Compensating Means II

The temperature-compensation means is part of the circuitry of the current-detecting means and implemented by the resistor R33 which takes the form of an NTC resistor and is located to ensure that it can detect any temperature variations of the machine in close contact with a suitable part of the machine, the electric motor or the winding, and increase the sensitivity of the current-detecting means accordingly. The reason for this arrangement is to be seen in the fact that the current variations produced by the same load will vary depending on whether the machine is in an heated-up or a cold condition, so that the heating-up of the NTC resistor R33 serves to raise the reference threshold at the comparator K1 to increase the sensitivity when the machine is warm. The NTC resistor R 33 is preferably arranged in such a manner that it is slowly heated up by the current supply resistor R1 after the machine has been switched on.

Retriggerable Timing Relay II

As mentioned before the capacitor C15 is charged every time the machine is loaded and the comparator K1 is switched over as a result thereof. Considering that the capacitor C15 is connected, together with a parallel discharging resistor R34, to the inverting input of a series-connected comparator K2, the latter switches its output to positive voltage (against ground, relative to the effective supply voltage $-U$) until the capacitor C 15 has discharged via the parallel resistor R34 to a value below the constant voltage applied to the other input of the comparator K2. To this end, a voltage divider comprising the resistors R30, R35 is additionally provided. The timing element comprising the components C15 and R34 is designed to delay the re-setting of the comparator K2, after switching off the comparator K1 in response to the termination or lessening of a loading condition, so that the desired pre-determined time lag is achieved and the electric motor will remain at working speed during short interruptions of work. It is a fact that work with electrically driven hand tools is frequently interrupted, for instance when during drilling the drill must be retracted for lubrication purposes or when during operation of a circular saw additional material must be fed to the working position. It goes without saying that the capacitor C15 is charged up anew every time a new loading condition is encountered, even though the machine may still operate at working speed, so that due to this retriggering the working speed is constantly available when work is interrupted for short periods of time only, and work is not unnecessarily disturbed by the motor switching immediately to idling speed every time work is interrupted.

The output signal of the comparator K2 of the retriggerable timing relay 4 is used in a triple manner, as will be described hereafter.

Speed-Changing Means II

One input E3 of the IC control unit 1 is supplied with a reference speed value via a voltage divider comprising the components R36, R37 and a capacitor C5 connected in parallel to R36. When the machine is operating at idling speed—no-load condition and output of K2 substantially at negative supply voltage ($-U$)—the resistor R 24 is consequently connected in parallel to R36 via the diode D5, and the voltage divider ratio leads to a control voltage at the input E3 which corresponds to the desired value of the idling speed (waiting speed), which is then actually adjusted by the speed control unit 1.

If, as mentioned before, the output of the comparator K2 shifts towards the ground potential due to a loading condition of the machine, the diode D5 is blocked and the resistor R24 is suppressed from the voltage divider ratio from R36, R37; as a result, the desired speed value at E3 shifts towards more positive voltages, and the electric motor M is accelerated to working speed.

Acceleration II

Simultaneously with the change-over of K2 at its output, an additional charging current is supplied through the series-connected resistors R23 and R38, and the diode D6 to a capacitor C8 which is connected to another input E4 of the IC control unit 1. This capacitor is part of a smooth-starting circuit within the control unit 1—the external connection of the capacitor C1 permits the degree of smoothness to be varied at desire—and one obtains by this arrangement a considerably steeper curve for the acceleration to working speed. This is particularly advantageous because it permits to avoid even the shortest starting or waiting times so that the user gets the impression that the machine responds immediately to any loading condition. Besides, the function of the control unit 1 is such that the capacitor C8 is discharged by an internal reset every time the machine is switched off so that the smooth starting system is constantly reactivated (suppression of high starting currents). This discharge of the capacitor C8 is of importance also for the gating of the initial current —which will be described below with respect to its effect on the change-over from idling speed to working speed.

Sensitivity Changing Means II

The electric motor absorbs more current at working speed than at waiting or idling speed, even in the no-load condition, so that it is necessary to reduce the sensitivity of the current-detecting means after acceleration of the machine; otherwise it would not be possible to switch back from working speed to idling speed at the end of a loading condition. Therefore, when the machine has been accelerated to working speed by a change-over of K2, the output of K2 which is also connected to the inverting input of another comparator K3—the other input of this comparator is connected to the same voltage divider connection point comprising the resistors R30, R35 as the comparator K2—sets the output of K3 to a substantially negative supply voltage (this applies of course only to the present practical example) so that the resistor R25 is connected in parallel to the capacitor C9' of the current-sensing means and its parallel resistors R15', R15''. This results in additional loading of the voltage integrated from the load current at the capacitor C9', and in order to keep the voltage at the capacitor C9+—at working speed at the level that would justify keeping the motor at working speed, a higher current would have to flow, which could be the case only when operating at working speed and under load. To say it in other words: The mere working speed of the machine cannot hold the potential at the capacitor C9' so that the comparator K1 is set back and the speed is finally switched back to idling speed, giving due consideration to the time constants from the parallel connection of C15 and R34.

Initial Current Gating Means II

The high initial current always encountered when switching on an electric motor—even if automatic smooth-starting means are installed—would cause the motor to be immediately accelerated to working speed and would, in addition, render the automatic smooth-starting means at least partially ineffective because of the high charging current supplied to the capacitor C8.

To avoid this effect, a circuit 8 for suppressing the effects of the initial current has been provided. In the example described herein, this circuit is formed by an additional comparator K4 whose one input is supplied with a constant reference potential via the series connection consisting of the resistors R26 and R27, and whose other input (non-inverting or +input) is connected to a timing circuit comprising a capacitor C16 and a resistor R39. It is of essential importance in this arrangement that the resistor R39 is connected to the base of the smooth-starting capacitor C8 (corresponding to input E4) as this arrangement leads to the following function. When the total system is switched on, the distribution of the potential supplied to the inputs of the comparator K4 is such that the capacitor K4 by-passes the capacitor C9' and prevents the building-up of a voltage to which the current-detecting circuit 3 could respond. Only when at the end of the smooth-starting period the capacitor C8 has been correspondingly charged does the voltage supplied via R39 to the non-inverting input of K4 get more positive than the voltage derived from the voltage divider circuit R26, R27, so that the comparator K4 blocks and permits the capacitor C9' to be charged. The setting of the timing element formed by R39/C10 is selected to prevent the capacitor C9' from being charged by short-time transient speed conditions.

As has been mentioned before, the capacitor C8 is discharged by the internal reset through the control unit 1 every time the machine is switched off. Correspondingly, the capacitor C9' is also by-passed by the comparator K1 every time the machine is switched on. This offers considerable advantages for instance when the machine is switched on and off in rapid sequence and at arbitrary intervals. In this case, there would otherwise exist the risk that the capacitor C16 cannot be discharged with sufficient rapidity and that, depending on the circumstances, it might perhaps not be possible to suppress the initial current.

All circuit components not marked with reference numbers in the non-integrated circuit shown in FIG. 2 are of less or even of no importance for the invention and have been included in the drawing only with a view to giving a comprehensive representation.

All the features described in the specification or the attached claims, or shown in the drawings, may be essential to the invention either alone or in any desired combination.

I claim:

1. A method for controlling an electric motor of the type for driving hand tools, saws, and the like, the rotational speed of which is automatically reduced during no-load idling operation and increased under load to predetermined speeds by sensing the electric motor current and evaluating it for abrupt changes in the effective voltage supplied to the motor, comprising the steps of:

(a) automatically changing the sensitivity range of the current-sensing means to a higher threshold value upon transition of the motor to a higher speed under load conditions; and (b) delaying for a predetermined time resetting the motor to a lower idling speed after transition to the no-load condition.

2. A method as in claim 1, in which a delay circuit is provided to prevent the immediate acceleration to working speed upon energization of the motor, said method further including the step of resetting said delay circuit to its initial condition when the motor is energized or de-energized.

3. A method as in claim 1 or 2, including the further step of controlling the sensitivity of the current-sensing means in response to the temperature of at least one out of the electric motor and circuit components.

4. The method of claim 1, comprising the further step of delaying the sensitivity adjustment of the current-sensing means for a pre-selected time upon transition of the motor to a higher speed under load conditions.

5. An apparatus for controlling an electric motor of the type for driving hand tools, saws and the like, the rotational speed of which is automatically reduced during no-load idling operation and increased under load to predetermined speeds by controlling the effective voltage applied to the motor by a speed control circuit which is controlled by a current sensor which senses the electric motor current, characterized in that:

retriggerable timing means is provided adapted to be connected between the current sensor and the speed control circuit and is operable in response to a preselected current threshold value corresponding to load conditions of the motor for applying a signal to the speed control circuit to maintain the speed of the motor at operating speed, and said retriggerable timing means being responsive to a current below said threshhold value for applying a signal to said speed control circuit to maintain the motor at operating speed for a pre-determined period of time after said current condition has been sensed.

6. The apparatus of claim 5, in which the current sensor is operable between two current threshold values, said retriggerable timing means maintaining said current sensor at the higher threshold value when said timing means has been triggered.

7. The apparatus of claim 5, and a timing element for operating said timing means to switch the current sensor to the higher current threshold value.

8. An apparatus as in any of claims 5-7, and a delay circuit connected to said timing means to delay operation of said timing means for a pre-determined period of time after energizing said apparatus.

9. An apparatus in accordance with any of claims 5 to 7, in which the current sensor comprises a resistor connected in series with the electric motor, and a switching element adapted to be connected between the resistor and to said timing means whereby the voltage drop across the resistor operates said switching element to trigger said timing means.

10. An apparatus as in claim 9, in which said switching element comprises a switching transistor.

11. An apparatus as in claim 10, in which said timing means comprises a capacitor connected to said switching element and adapted to be charged through said switching element, whereby the charging voltage of said capacitor controls the speed control circuit.

12. An apparatus as in claim 11, in which said timing means further comprises a resistor connected to said capacitor, the time constant of said capacitor and said resistor determining the time delay for said pre-determined period of time.

13. An apparatus as in claim 12, in which said current sensor includes a voltage divider connected said timing means, and means connecting said switching element to said resistor through the voltage divider whereby said timing means controls the voltage applied to said switching element.

14. An apparatus as in claim 11, and an integrator circuit connected to said capacitor through a diode, said diode being polarized so that said diode is blocked at the end of the time constant determined by said integrator circuit after energization of said apparatus.

15. An apparatus as in claim 14, and a comparitor circuit, reference means for generating a reference signal dependent on the temperature of the system and connected to one input of said comparitor, means connecting said integrator circuit to the other input of said comparitor whereby said comparitor produces an output signal proportional to the comparision between the signals at the inputs thereof, the output of said comparitor being connected to said timing means and operable to maintain the motor at the operating speed for a predetermined period of time.

16. An apparatus as in claim 15, and a suppression circuit adapted to be connected to said current sensor to suppress the high initial current produced when the system is initially energized to eliminate immediate acceleration of the motor to working speed.

17. An apparatus as in claim 16, in which said suppression circuit comprises a comparitor having one input connected to a constant voltage source, and another input connected to a reference voltage which varies in proportion to the speed of the motor, the output of said comparitor being adapted to be connected to the current sensor.

18. An apparatus as in claim 17, and a smooth-starting circuit adapted to be connected to said current sensor for insuring smooth-starting of said motor upon initial energization of said apparatus, and reset means connected to said smooth-starting circuit for resetting said smooth-starting circuit upon de-energization of said apparatus.

19. An apparatus as in claim 18, and means interconnecting said timing means and said smooth-starting circuit to insure acceleration of the motor when said operating speed is required.

* * * * *